(12) United States Patent
Meguro et al.

(10) Patent No.: US 9,436,861 B2
(45) Date of Patent: Sep. 6, 2016

(54) BOARD CONNECTION STRUCTURE AND ELECTRONIC DEVICE

(71) Applicant: CASIO COMPUTER CO., LTD., Shibuya-ku, Tokyo (JP)

(72) Inventors: Hiromasu Meguro, Kanagawa (JP); Satoshi Ogasawara, Akishima (JP); Jun Uchino, Hino (JP); Yasunori Chiba, Tachikawa (JP); Youichi Ushigome, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/808,632

(22) Filed: Jul. 24, 2015

(65) Prior Publication Data
US 2016/0064874 A1 Mar. 3, 2016

(30) Foreign Application Priority Data

Aug. 28, 2014 (JP) ................................. 2014-173611

(51) Int. Cl.
*G06K 7/10* (2006.01)

(52) U.S. Cl.
CPC ..... *G06K 7/10881* (2013.01); *H01H 2231/022* (2013.01)

(58) Field of Classification Search
CPC .. G06F 1/1637; G06F 1/1626; G06F 1/1656; G06F 1/169; G06F 21/32; G06F 3/0346; G06F 3/045; H04M 1/236; H04M 2250/22; H04M 1/026; H04M 1/0266; H04M 2250/12; H04M 2250/16; H04M 2250/18; H01H 13/702; H01H 2221/002; H01H 2229/028; H01H 2231/002; G06K 9/00013; G06K 9/00087
USPC ............. 235/462.01–462.48, 472.01–472.03, 235/380, 449, 493
See application file for complete search history.

(56) References Cited

U.S. PATENT DOCUMENTS

| | | | | |
|---|---|---|---|---|
| 2001/0039131 | A1* | 11/2001 | Murakami | H01R 9/226 439/76.2 |
| 2007/0241971 | A1* | 10/2007 | Tsujimura | G06F 1/1616 343/702 |
| 2007/0260558 | A1* | 11/2007 | Look | G06Q 20/20 705/76 |
| 2009/0122653 | A1* | 5/2009 | Seki | G02F 1/13452 368/82 |
| 2012/0088547 | A1* | 4/2012 | Lee | G06K 7/10881 455/556.2 |
| 2014/0152596 | A1* | 6/2014 | Park | G06F 1/1626 345/173 |

FOREIGN PATENT DOCUMENTS

JP 08300966 A 11/1996

* cited by examiner

Primary Examiner — Thien M Le
(74) Attorney, Agent, or Firm — Holtz, Holtz & Volek PC

(57) ABSTRACT

A board connection structure including a wiring board having a contact point section provided at one end portion and opposed to a switch button, and a holding member to which the wiring board is attached with flat surfaces of the contact point section and the connection section on the same surface intersecting with each other by the folding of the wiring board.

12 Claims, 7 Drawing Sheets

BOARD CONNECTION STRUCTURE AND ELECTRONIC DEVICE

CROSS-REFERENCE TO RELATED APPLICATION

This application is based upon and claims the benefit of priority from the prior Japanese Patent Application No. 2014-173611, filed Aug. 28, 2014, the entire contents of which are incorporated herein by reference.

BACKGROUND OF THE INVENTION

1. Field of the Invention

The Present invention relates to a board connection structure that is used in various electronic devices such as a portable terminal device or a portable phone, and an electronic device having the board connection structure.

2. Description of the Related Art

For example, a board connection structure is known in which, when a circuit board in a device and a motherboard are to be electrically connected to each other, an adaptor connector is connected to the circuit board in the device by connecting wires, and the adaptor connector is plugged into a connector provided in the motherboard so that the circuit board in the device and the motherboard are electrically connected to each other, as described in Japanese Patent Application Laid-Open (Kokai) Publication. No. 08-300966.

However, in this type of board connection structure, when the device is to be attached to the motherboard, it cannot be attached to the motherboard unless the adaptor connector connected to the circuit board in the device has been connected in advance to the connector provided in the motherboard. Therefore, there are problems in that a connecting operation is troublesome, and the number of parts increases due to the adaptor connector being required to be connected to the circuit board in the device by connecting wires to provide the connector in the motherboard, whereby cost reduction cannot be achieved.

SUMMARY OF THE INVENTION

An object of the present invention is to provide a board connection structure capable of reducing the number of parts and achieving the simplification of a connecting operation and cost reduction, and an electronic device having this board connection structure.

In accordance with one aspect of the present invention, there is provided a board connection structure comprising: a wiring board having a contact point section provided at one end portion and opposed to a switch button and a connection section provided at the other end portion on the same surface where the contact point section is provided and opposed to a circuit board; and a holding member to which the wiring board is attached with flat surfaces of the contact point section and the connection section on the same surface intersecting with each other by folding of the wiring board.

According to the present invention, the flat surfaces of the contact point section and the connection section on the same surface can be intersected with each other by the folding of the wiring board, and the wiring board can be mounted to the holding member in this state. Accordingly, the switch button and the circuit board can be easily connected by the holding member being opposed to the switch button and the circuit board. Since a connecting member such as a connector is not necessary, the number of the parts can be reduced and the length of the wiring can be reduced to the minimum length, whereby the wiring operation and the connecting operation can be simplified and the cost can be reduced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 5A and 5B show the wiring board depicted in FIG. 4, of which FIG. 5A is an enlarged perspective view of the wiring board, and FIG. 5B is an enlarged sectional view of the wiring board taken along line B-B in FIG. 5A;

FIG. 6A and FIG. 6B show the holding member depicted in FIG. 4, of which FIG. 6A is an enlarged perspective view showing the front surface side of the holding member, and FIG. 6B is an enlarged perspective view showing the back surface side of the holding member.

DETAILED DESCRIPTION OF THE PREFERRED EMBODIMENT

Hereafter, an embodiment where the present invention has been applied to a portable terminal device will be described with reference to FIG. 1 to FIG. 7.

Figure 1:
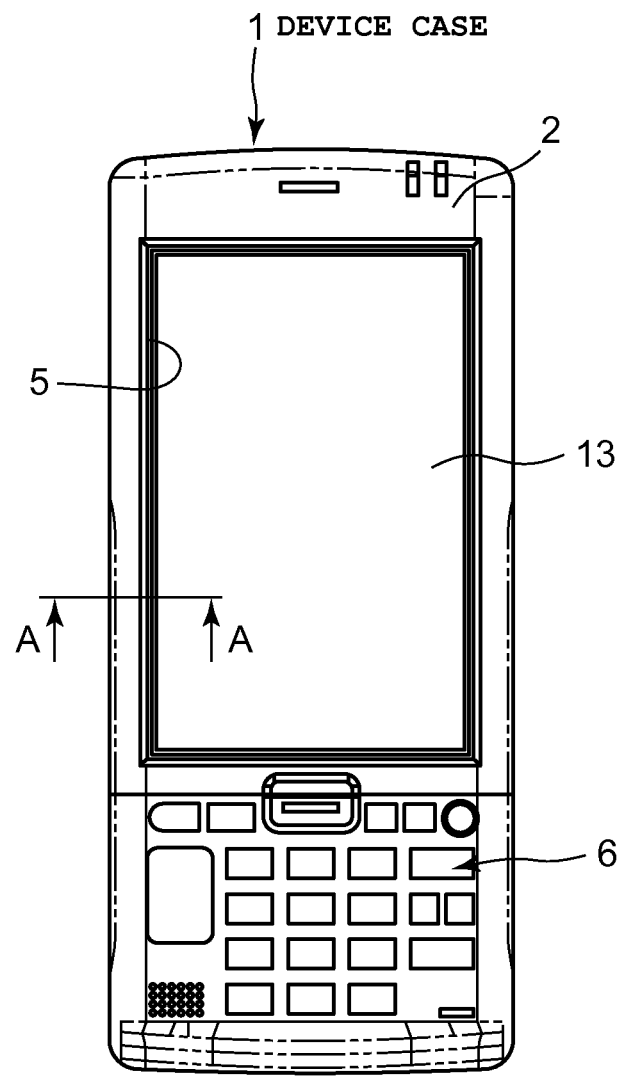
FIG. 1 is a front view showing an embodiment where the present invention has been applied to a portable terminal device.
Figure 2:
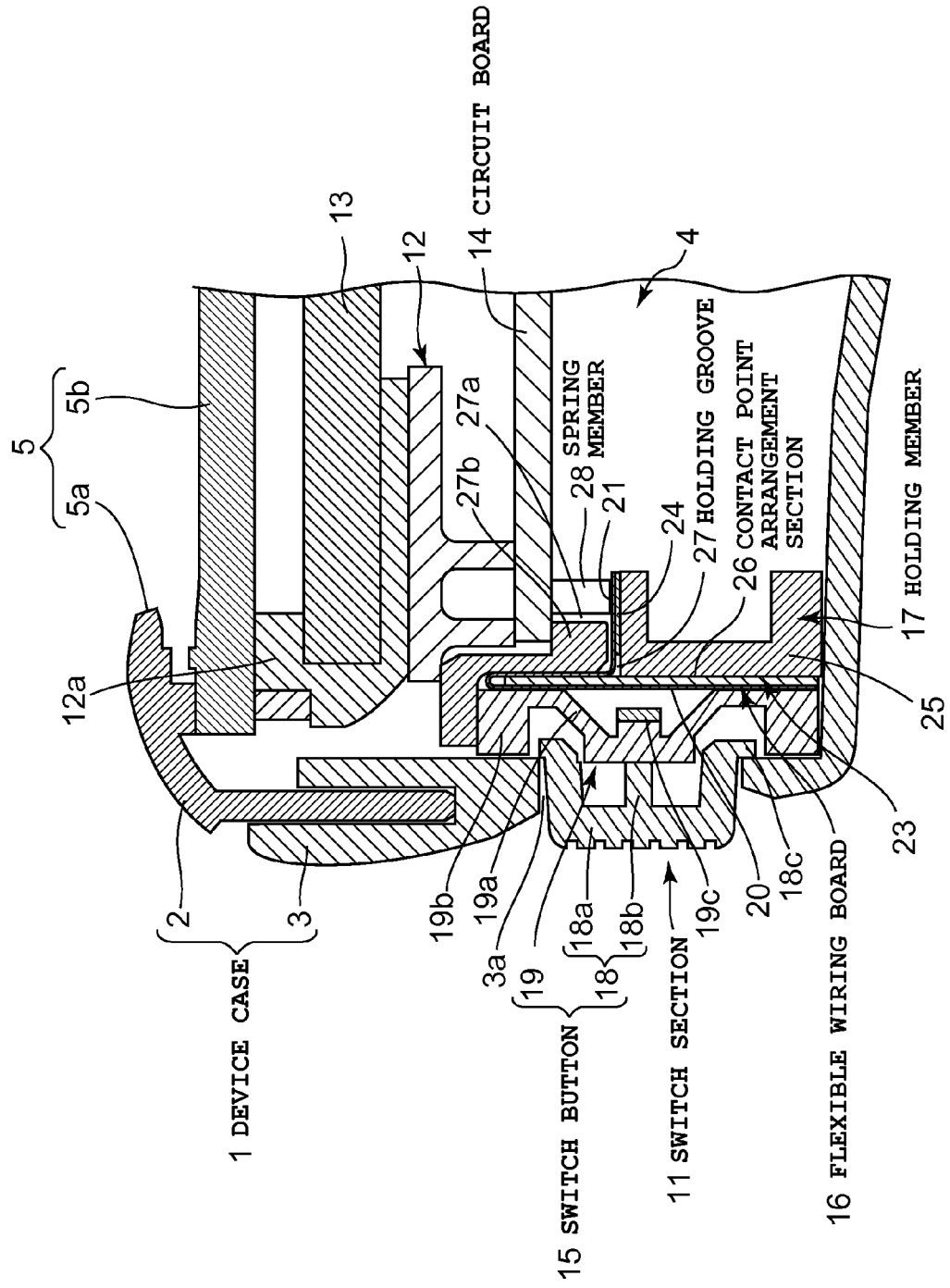
FIG. 2 is an enlarged sectional view of the main portion of the portable terminal device taken along line A-A in FIG. 1.
Figure 3:
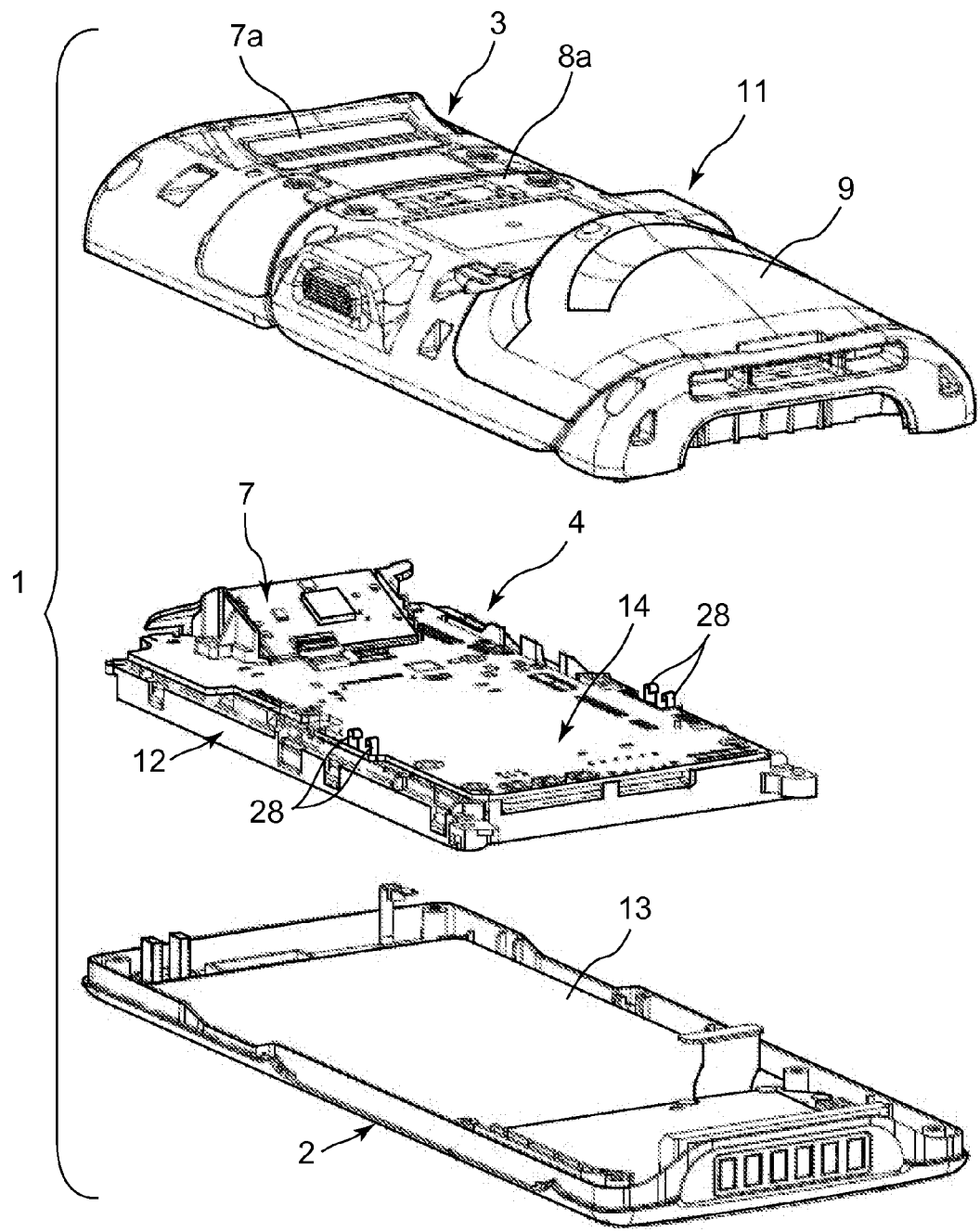
FIG. 3 is a perspective view showing a state where the portable terminal device depicted in FIG. 1 has been inverted to be upside down and a device case has been disassembled.

This portable terminal device includes a rectangular device case 1 elongated in a front-back direction (a vertical direction in FIG. 1), as depicted in FIG. 1 to FIG. 3.

The device case 1 has an upper case 2 and a lower case 3, and is structured such that a module 4 is mounted in these upper case 2 and lower case 3.

The upper case 2 is formed such that its upper surface has a substantially rectangular flat shape, and structured such that a side surface portion on its outer periphery is attached to the lower case 3, as depicted in FIG. 1 to FIG. 3.

In this embodiment, a display window section 5 is provided on a substantially upper half of the upper surface of the upper case 2, and a key input section 6 is provided on a substantially lower half thereof.

The display window section 5 includes a substantially rectangular opening section 5a formed on the upper surface of the upper case 2 and a protection glass 5b provided along an edge portion of the opening section 5a so as to cover the opening section 5a, as depicted in FIG. 1 and FIG. 2.

The key input section 6 includes various keys required for the portable terminal device, such as numeric keys, a cursor, and function keys.

Figure 4:
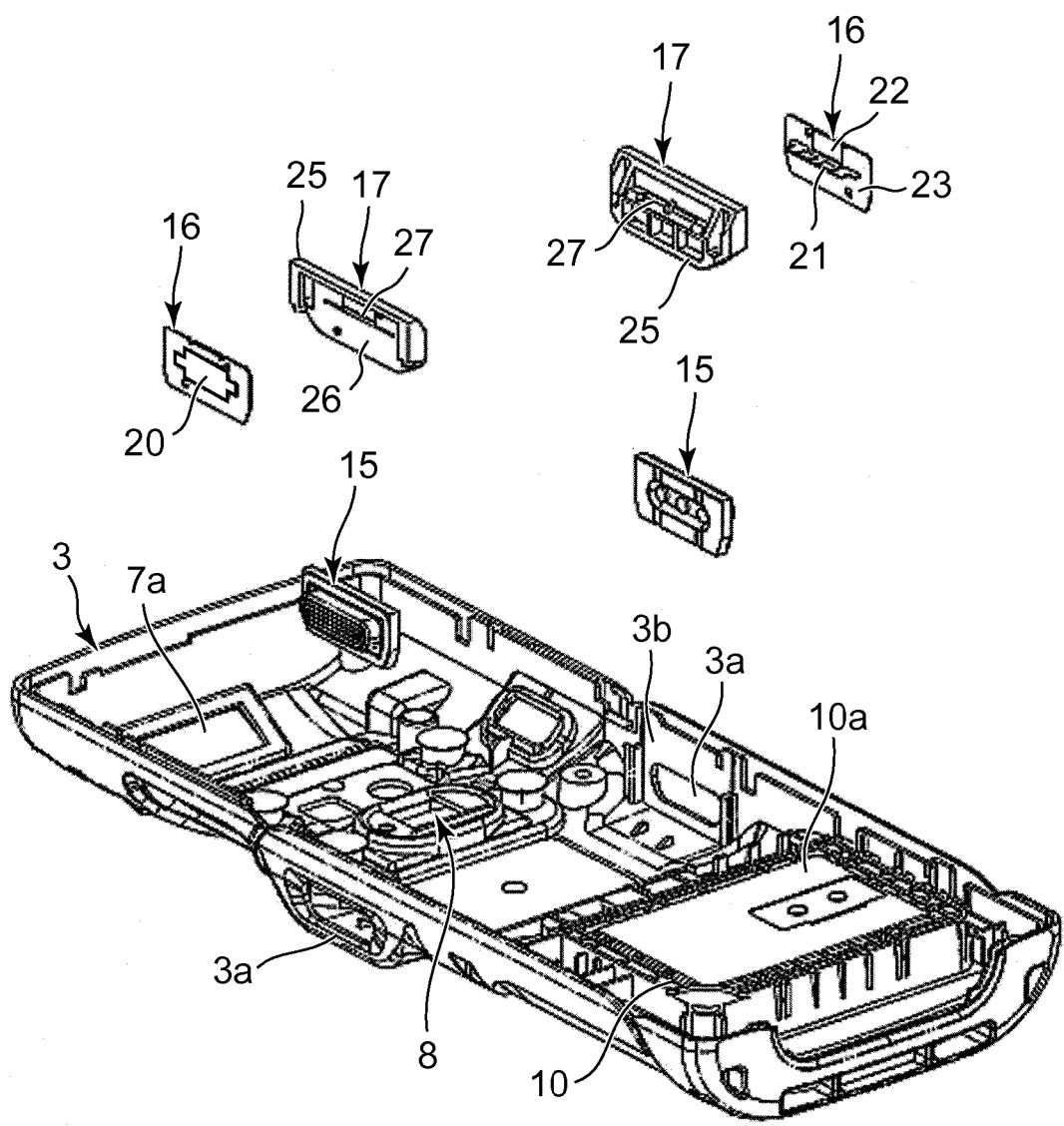
FIG. 4 is an exploded perspective view of the main portion, in which the lower case of the device case shown in FIG. 3 has been inverted, and switch buttons, wiring boards, and holding members are attached thereto.

The lower case 3 is formed such that a side surface portion on its outer periphery is curved in an arc shape toward a bottom portion of the lower case 3 as depicted in FIG. 2 to FIG. 4, and structured such that an upper portion of the side surface portion is attached with a lower portion of the side surface portion of the upper case 2.

On an upper side portion of this lower case 3, a reading window section 7a of an optical reading section 7 described later is provided.

Also, on a substantially intermediate portion of the lower case 2 in the front-back direction (an obliquely left-right direction in FIG. 4), a connecting lid 8a which openably and closably covers an external connecting section 8 is provided, as depicted in FIG. 2 to FIG. 4.

Moreover, on a lower side portion of the lower case 3, a battery lid 9 which openably and closably covers a battery accommodating section 10 for accommodating a rechargeable battery 10a is detachably attached.

Furthermore, on side portions of a substantially intermediate portion of the lower case 3 in the front-back direction, switch sections 11 described later are provided, respectively.

The module 4 includes an inner case 12, and is structured such that various parts required for the portable terminal device, such as a display panel 13 and a circuit board 14, are mounted therein, as depicted in FIG. 2 and FIG. 3.

The display panel 13 is a flat-type display panel such as a liquid crystal display panel, or an EL (electroluminescent) display panel, and structured to electro-optically display various information required for the portable terminal device.

That is, the display panel 13, which is attached to the inner case 12 by an attaching members 12a in a manner to correspond to the display window section 5 of the upper case 2, is structured such that displayed information can be seen from above the upper case 2 through the display window section 5, as depicted in FIG. 2 to FIG. 4. The circuit board 14 includes various electronic parts required for the portable terminal device, such as the optical reading section 7, and is arranged over a substantially whole area of the lower surface (an upper surface in FIG. 3) of the inner case 12.

In this embodiment, the optical reading section 7 is structured to be arranged on the upper side portion of the lower surface (the upper surface in FIG. 3) of the circuit board 14, and to emit a laser beam from the reading window section 7a of the lower case 3 to the outside of the device case 1, receive a reflected light of the emitted laser beam, and thereby read a barcode on an article or the like, as depicted in FIG. 3 and FIG. 4.

The switch sections 11 provided on both sides of the substantially intermediate portion of the lower case 3 are trigger switches, respectively, and are each provided with a switch button 15, a flexible wiring board 16, and a holding member 17, as depicted in FIG. 2 and FIG. 4. The switch button 15 has a button section 18 and an elastic section 19.

The button section 18, which has a cap-shaped head section 18a and an operation shaft section 18b provided in a central portion of the head section 18a as depicted in FIG. 2, is structured such that the head section 18a is arranged in a button insertion hole 3a provided on a side surface portion of the lower case 3 such that it can protrude from the button insertion hole 3a.

In this embodiment, a stopper piece 18c that comes in contact with an inner peripheral edge of the button insertion hole 3a of the lower case 3 to prevent the head section 18a from slipping out to the outside is provided on an inner end portion on an outer periphery of the head section 18a.

The elastic section 19, which is formed by the bulging of an elastic sheet composed of urethane rubber, silicon rubber, and the like, is structured to elastically push out the button section 18 with it corresponding to the flexible wiring board 16, as depicted in FIG. 2.

That is, the elastic section 19 is formed at a central portion of the elastic sheet such that a bulging section 19a projects toward the button section 18.

On a peripheral edge portion of this bulging section 19a, an attaching section 19b is provided which is arranged between the wiring board 16 and a side surface portion of the lower case 3.

In this embodiment, a movable contact point 19c is provided on the inner surface of the bulging section 19a, as depicted in FIG. 2.

Note that, although the switch button 15 is structured such that the operation shaft section 18b of the button section 18 is fixed to the outer surface of the bulging section 19a of the elastic section 19 by adhesive, the present invention is not limited thereto, and a structure may be adopted in which the button section 18 and the elastic section 19 are integrally formed by two-color molding.

As a result, the switch button 15 is structured such that the button section 18 is pushed out of the button insertion hole 3a of the lower case 3 toward the outside by the bulging section 19a of the elastic section 19 such that the movable contact point 19c within the bulging section 19a is separated from the wiring board 16, as depicted in FIG. 2.

Also, the switch button 15 is structured such that, when the button section 18 is pushed inward from the outside of the lower case 3, the bulging section 19a of the elastic section 19 is elastically deformed and the movable contact point 19c is elastically pressed against the wiring board 16.

Figure 5A:
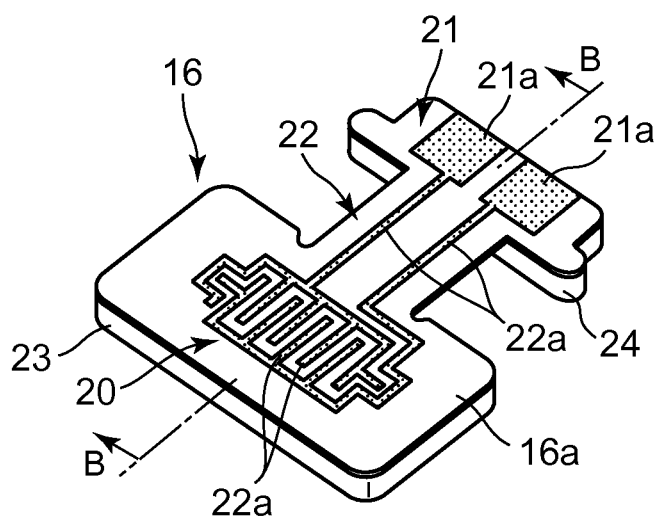
Figure 5B:
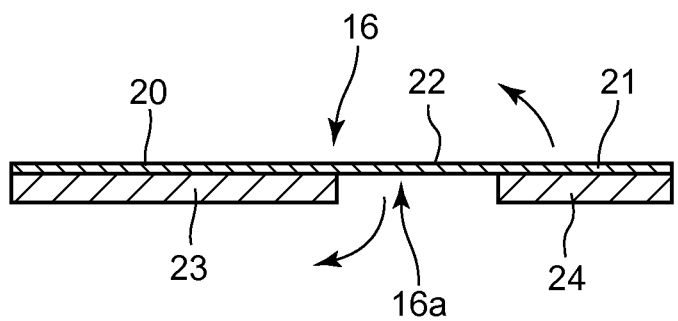

The wiring board 16, which includes a bendable (flexible) film 16a, is structured such that an input contact point section 20 that is opposed to the switch button 15 is provided at one end portion of the film 16a, a connection terminal section 21 that is opposed to the circuit board 14 is provided at the other end portion of the film 16a on the same surface where the input contact point section 20 is provided, and a connection wiring section 22 that electrically connects these members is provided between the input contact point section 20 and the connection terminal section 21, as depicted in FIG. 2, FIG. 4 and FIG. 5.

Figure 7:
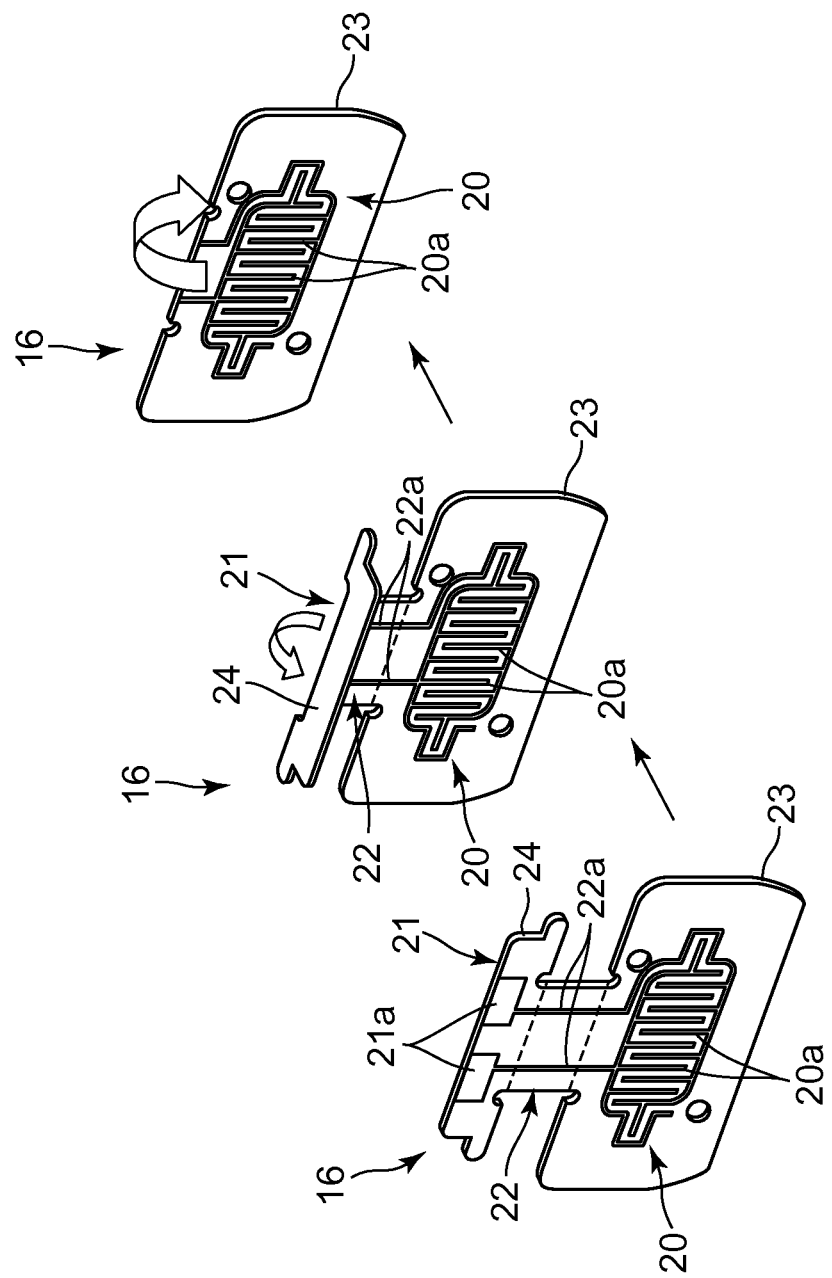
FIG. 7 shows enlarged perspective views showing the folding of the wiring board depicted in FIG. 5.

That is, the flexible wiring board 16 is structured such that, by a foil of a metal such as copper or aluminum being formed on one surface of the film 16a and the metal foil being patterned, the input contact point section 20 is patterned on one end portion of the film 16a, the connection terminal section 21 is patterned on the other end portion thereof on the same surface of the film 16a, and the connection wiring section 22 is patterned between the input contact point section 20 and the connection terminal section 21, as depicted in FIG. 5 and FIG. 7.

In this embodiment, the input contact point section 20 is formed with a pair of comb-shaped electrode sections 20a, as depicted in FIG. 5 and FIG. 7. The connection terminal section 21 is formed with a pair of rectangular electrode sections 21a, and the connection wiring section 22 is formed with a pair of line-shaped electrode lines 22a. The flexible wiring board 20 is structured such that a first reinforcement plate 23 corresponding to the input contact point portion 20 and a second reinforcement plate 24 corresponding to the connection terminal section 21 are provided on a surface opposite to a surface where the input contact point section 20, the connection terminal section 21, and the connection wiring section 22 are provided.

As a result, the wiring board 16 is structured such that the connection wiring section 22 located between the first reinforcement plate 23 and the second reinforcement plate 24 can be freely folded, as depicted in FIG. 5 and FIG. 7. The wiring board 16 is structured to be attached to the holding member 17 by the connection wiring section 22 being flexibly folded, as depicted in FIG. 2 and FIG. 7.

That is, the wiring board 16 is structured such that the connection wiring section 22 is folded at an edge portion of the second reinforcement plate 24 at a substantially right angle toward a side (the left side in FIG. 7) opposite to the first reinforcement plate 23 and, in this state, the connection wiring section 22 is folded at an edge portion of the fir reinforcement plate 23 toward the back surface side (the right side in FIG. 7) of the first reinforcement plate 23 such that it is folded back while overlapping with the back surface of the first reinforcement plate 23, as depicted in FIG. 2, FIG. 5 and FIG. 7.

As a result, the wiring board 16 is structured such that the second reinforcement plate 24 is arranged to be perpendicular to the back surface of the first reinforcement plate 23 so that the connection wiring section 22 can be flexibly folded with the input contact point section 20 and the connection terminal section 21 being orthogonal to each other, as depicted in FIG. 2, FIG. 4, FIG. 5 and FIG. 7.

Figure 6A:
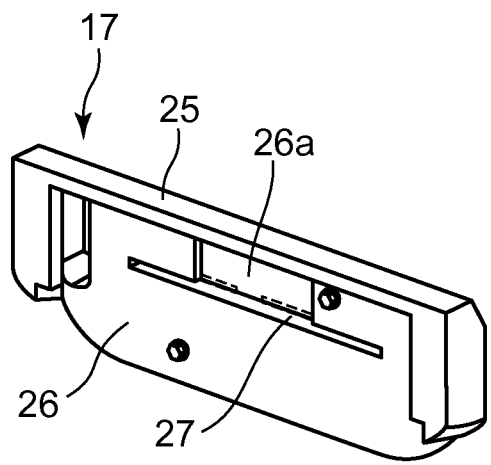
Figure 6B:
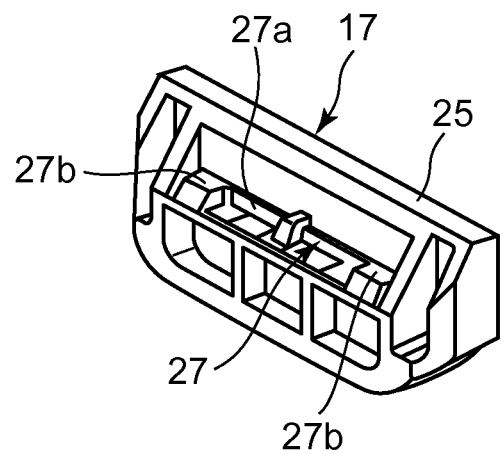

On the other hand, the holding member 17 is structured such that, in a state where the connection wiring section 22 of the wiring board 16 has been flexibly folded so that the respective flat surfaces of the input contact point section 20 and the connection terminal section 21 positioned on the same surface are orthogonal to each other, the holding member 17 is mounted in the device case 1 so that the input contact point section 20 and the connection terminal section 21 correspond to the switch button 15 and the circuit board 14, as depicted in FIG. 2, FIG. 4 and FIG. 6.

That is, the holding member 17 includes a holding main body section 25 that is arranged at an attaching section 3b provided on a side surface portion corresponding to the button insertion hole 3a of the lower case 3, a contact point arrangement section 26 which is provided on the holding main body section 25 and in which the input contact point section 20 of the folded wring board 16 and the first reinforcement plate 23 are arranged, and a holding groove 27 which is provided in the holding main body section 25 and into which the connection terminal section 21 and the second reinforcement plate 24 are inserted, as depicted in FIG. 2, FIG. 4 and FIG. 6.

In this embodiment, the contact point arrangement section 26 is an accommodating recessed portion provided in one surface of the holding main body section 25 opposing the attaching section 3b of the lower case 3. This contact point arrangement section 26 is structured such that the input contact point section 20 of the wiring board 16 and the first reinforcement plate 23 are arranged therein with them overlapping with each other and the elastic section 19 of the switch section 15 is further arranged therein with it overlapping with the input contact point section 20, as depicted in FIG. 2, FIG. 4 and FIG. 6.

In the contact point arrangement section 26, a wiring groove section 26a where the connection wiring section 22 of the folded wiring board 16 is arranged is provided from an upper side portion of the holding main body section 25 to the holding groove 27 at an intermediate portion thereof, as depicted in FIG. 2, FIG. 4 and FIG. 6. The holding groove 27 is a flat-shaped slit hole horizontally provided in the intermediate portion of the holding main body section 25, and the connection terminal section 21 and the second reinforcement plate 24 overlapping with each other are inserted into the holding groove 27.

In this embodiment, a notch section 27a is provided in the holding groove 27, which exposes a tip end portion side of the inserted connection terminal section 21 upward when the connection terminal section 21 and the second reinforcement plate 24 are inserted into the holding groove 27, as depicted in FIG. 2, FIG. 4 and FIG. 6. Also, the holding member 17 is provided with a board supporting section 27b that supports the edge portion of the circuit board 14 positioned above the notch section 27a.

As a result, the holding member 17 is structured such that the input contact section 20 of the circuit board 16 and the first reinforcement plate 23 overlapping with each other are arranged in the contact point arrangement section 26, the connection terminal section 21 of the wiring board 16 and the second reinforcement plate 24 overlapping with each other are inserted into the holding groove 27, the inserted connection terminal section 21 is exposed upward from the notch section 27a of the holding groove 27, and the wiring board 16 is attached to the holding member 17 in this state, as depicted in FIG. 2, FIG. 4 and FIG. 6.

Also, the holding member 17 is structured to press the switch button 15 against the attaching section 3b of the lower case 3 and hold it when the holding main body section 25 attached with the wiring board 16 is arranged at the attaching section 3b in the lower case 3, as depicted in FIG. 2, FIG. 4 and FIG. 6.

That is, the holding member 17 is structured to press the attaching section 19b of the elastic section 19 against the attaching section 3b of the lower case 3 and hold it when the button section 18 is inserted into the button insertion hole 3a of the lower case 3 so that the elastic section 19 is arranged in the contact point arrangement section 26, and the holding main body section 25 is arranged at the attaching section 3b in the lower case 3 in this state.

Moreover, the holding member 17 is structured such that, when the holding main body section 25 attached with the wiring board 16 is arranged at the attaching section 3b in the lower case 3, the connection terminal section 21 inserted into the holding groove 27 is exposed upward from the notch section 27a and opposed to the circuit board 14 with the connection terminal section 21 being electrically connectable to the circuit board 14, as depicted in FIG. 2, FIG. 4 and FIG. 5. In this embodiment, a pair of spring members 28 that resiliently come in contact with the pair of electrode sections 21a constituting the connection terminal section 21 of the wiring board 16 are provided on the circuit board 14.

The pair of spring members 28 are leaf springs or coil springs, as depicted in FIG. 2 and FIG. 3.

These spring members 28 are structured such that, when the circuit board 14 attached with the inner case 12 is arranged in the lower case 3 in a state where the holding main body section 25 attached with the wiring board 16 has been arranged at the attaching section 3b within the lower case 3, the pair of spring members 28 are each arranged in the notch section 27a provided in the holding groove 27 of the holding member 17 to electrically connect the connection terminal section 21 and the circuit board 14 to each other.

Furthermore, the holding member 17 is structured to support the edge portion of the circuit board 14 positioned near the pair of spring members 28 by the board supporting section 27b when the circuit board 14 and the inner case 12 are arranged in the lower case 3 with the holding main body section 25 being arranged at the attaching section 3b in the lower case 3, as depicted in FIG. 2 and FIG. 6.

As a result, the holding member 17 is structured to maintain a constant spacing between the connection terminal section 21 and the circuit board 14 and keep a contact pressure of the spring members 28 to the connection terminal section 21 constant.

Next, the assembly of the portable terminal device will be described.

First, the module 4 to be mounted in the device case 1 is assembled. In this embodiment, the display panel 13 is attached to the inner case 12 by the attaching member 12a and the circuit board 14 is attached thereto.

Here, various parts such as the optical reading section 7 and the pair of spring members 28 are preliminarily attached to the circuit board 14, and then the circuit board 14 is attached to the inner case 12. As a result, the module 4 is assembled.

Before the module 4 is mounted in the lower case 3, the wiring board 16 is first attached to the holding member 17, and then the holding member 17 and the wiring board 16 are mounted to the attaching section 3b in the lower case 3. Here, first, the connection wiring section 22 of the wiring board 16 is folded at the edge portion of the second reinforcement plate 24 at a substantially right angle toward the side opposite to the first reinforcement plate 23, that is, the side of the input contact point section 20, as depicted in FIG. 7.

In this state, the connection wiring section 22 is folded at the edge portion of the first reinforcement plate 23 toward the back surface side of the first reinforcement plate 23 such that it is folded back while overlapping with the back surface of the first reinforcement plate 23.

As a result, the wiring board 16 is arranged with the second reinforcement plat 24 being perpendicular to the back surface of the first reinforcement plate 23, whereby the wiring board 16 is folded with the respective flat surfaces of the input contact point section 20 and the connection terminal section 21 being orthogonal to each other, as depicted in FIG. 2 and FIG. 4.

When the folded wiring board. 16 is to be mounted to the holding member 17, the connection terminal section 21 and the second reinforcement plate 24 are first inserted into the holding groove 27 of the holding member 17 from the side of the contact point arrangement section 26, and the inserted connection terminal section 21 is exposed to the upper side with it corresponding to the notch section 27a of the holding groove 27.

In this state, the input contact point section 20 of the wiring board 16 and the first reinforcement plate 23 are arranged in the contact point arrangement section 26 of the holding member 17.

Here, the folded-back connection wiring section 22 arranged on the back surface of the first reinforcement plate 23 is arranged in the wiring groove section 26a provided in the contact point arrangement section 26 of the holding member 17.

Accordingly, even though the connection wiring section 22 is overlapping with the back surface of the first reinforcement plate 23 provided at the input contact point section 20 with it being folded back, the input contact point section 20 and the first reinforcement plate 23 are favorably arranged in a flat state without rattling, in the contact point arrangement section 26 of the holding member 17.

As a result, the wiring board 16 is attached to the holding member 17.

Next, the holding member 17 having the wiring board 16 attached thereto is arranged at the attaching section 3b in the lower case 3.

Here, the elastic section 19 of the switch button 15 is arranged in the contact point arrangement section 26 of the holding member 17 in a manner to overlap with the input contact point section 20 of the wiring board 16.

As a result, the switch button 15 is held in the contact point arrangement section 26 of the holding member 17 with the elastic section 19 of the switch button 15 being opposed to the input contact point section 20 of the wiring board 16.

In this state, the button section 18 of the switch button 15 is inserted into the button insertion hole 3a provided on the side surface portion of the lower case 3 from the inside of the button insertion hole 3a, so that the holding member 17 is arranged at the attaching section 3b of the lower case 3. In this state, the module 4 is arranged in the lower case 3.

As a result, the holding member 17 is arranged with it being interposed between the side surface portion of the inner case 12 and the attaching section 3b of the lower case 3, and the attaching section 19b of the elastic section 19 of the switch button 15 is arranged with it being interposed between the contact point arrangement section 26 of the holding member 17 and the side surface portion of the lower case 3.

Here, the head section 18a of the button section 18 is elastically inserted into the button insertion hole 3a of the lower case 3 by the bulging section 19a of the elastic section 19 of the switch button 15, and the stopper piece 18c of the head section 18a comes in contact with the edge portion of the button insertion hole 3a.

In this state, the head section 18a of the button section 18 is protruding from the button insertion hole 3a of the lower case 3 to the outside, and the movable contact point 19c provided within the bulging section 19a of the elastic section 19 of the switch button 15, which can come in and out of contact with the input contact point section 20, is away from the input contact point section 20 of the wiring board 16.

Also, when the module 4 is to be arranged in the lower case 3 in this manner, the pair of spring members 28 provided on the circuit board 14 are each arranged within the notch section 27a of the holding groove 27 in the holding member 17, and come in resilient contact with the pair of electrode sections 21a in the connection terminal section 21 of the wiring board 16.

As a result, the connection terminal section 21 of the wiring board 16 and the circuit board 14 are electrically connected to each other by the pair of spring members 28.

Here, the edge portion of the circuit board 14 near the pair of spring members 28 is supported by the board supporting section 27b of the holding member 17, whereby a space between the circuit board 14 and the connection terminal section 21 opposing the circuit board 14 is kept constant.

Accordingly, the pair of spring members 28 provided on the circuit board 14 comes in contact with the connection terminal section 21 with a constant contact pressure.

As a result, the module 4 is mounted in the lower case 3 and also the switch sections 11 are mounted.

In this state, the optical reading section 7 provided on the circuit board 14 has been arranged opposing the reading window section 7a of the lower case 3.

Then, the upper case 2 is attached to the lower case 3 by screws.

Here, the display panel 13 of the module 4 corresponds to the display window 5 of the upper case 2 and the key input section 6 corresponds to the lower side portion of the circuit board 14 of the module 4.

As a result, the portable terminal device is assembled.

Next, the operation of the portable terminal device is described.

When the power of the portable terminal device is turned on, menu information is displayed on the display panel 13. Then, when the user performs a touch operation while viewing the displayed information, the menu is selected.

In this state, by operating the key input section 6, the user can perform an arithmetic operation.

In a case where a barcode on an article is read by the portable terminal device, the current mode is switched to a reading mode where the optical reading section 7 is used, by one of the switch portions 11 provided on the sides of the device case 1 being operated. In this state, when the other switch section 11 is operated, the optical reading section 7 starts a reading operation.

Here, the optical reading section 7 emits a laser beam from the reading window section 7a, and receives a reflected light of the emitted laser beam, whereby the barcode on the article is read.

In this case, in the switch section 11, when the button section 18 of the switch button 15 is pressed toward the inside of the device case, the operation shaft section 18b of the button section 18 presses the bulging section 19a of the elastic section 19 so as to elastically deform it, and the movable contact point 19c provided within the bulging section 19a come in contact with the input contact point section 20 of the wiring board 16 to make the pair of electrode sections 20a of the input contact point section 20 conductive.

As a result, a conduction signal is outputted by the input contact point section 20 of the wiring board 16 as a trigger signal. This trigger signal, which is the conduction signal, is transmitted to the connection terminal section 21 via the connection wiring section 22 and provided to the circuit board 14 from the connection terminal section 21 via the pair of spring members 28.

As a result, the barcode on the article is read by the optical reading section 7.

As described above, the board connection structure of this portable terminal device includes the wiring board 16 having the input contact point section 20 provided at one end thereof and opposing the switch button 15 and the connection terminal section 21 provided on the other end on the same surface as that of the input contact point section 20 and opposing the circuit board 14, and the holding member 17 attached with the wiring board 16 with the respective flat surfaces of the input contact point section 20 and the connection terminal section 21 on the same surface being orthogonal to each other by the folding of the wiring board 16. As a result, the number of the parts can be reduced, the connection operation can be simplified, and the cost can be reduced.

That is, in this board connection structure, the respective surfaces of the input contact section 20 and the connection terminal section 21 provided on the same surface can be orthogonalized to each other by the wiring board 16 being folded, and the wiring board 16 can be mounted to the holding member 17 in this state, so that the switch button 15 and the circuit board 14 can be easily and reliably connected to each other by the holding member 17 being opposed to the switch button 15 and the circuit board 14.

Accordingly, in this board connection structure, a connection part such as the connector described in the prior technique is not necessary. As a result, the number of the parts can be reduced. In addition, since the wiring board 16 is not required to be arranged on many portions and the switch button 15 and the wiring board 14 can be arranged close to each other, the length of the wiring can be shorten to the minimum, whereby the wiring operation and the connecting operation can be simplified and the cost can be reduced.

In this case, the holding member 17 has the contact point arrangement section 26 where the input contact point section 20 is arranged opposing the switch button 15 with the respective surfaces of the input contact point section 20 and the connection terminal section 21 positioned on the same surface being orthogonal to each other by the folding of the wiring board 16, and the holding groove 27 where the connection terminal section 21 is inserted and exposed to oppose the circuit board 14. As a result, the connection terminal section 21 can be fixed by being inserted into the holding groove 27 of the holding member 17, and the input contact point section 20 can be arranged in the contact point arrangement section 26 of the holding member 17, whereby the wiring board 16 can be easily and reliably mounted to the holding member 17.

That is, the wiring board 16 has the connection wiring section 22 provided between the input contact point section 20 at the one end portion of the bendable film 16a and the connection terminal section 21 at the other end portion thereof. This wiring board 16 can be folded back with it overlapping with the back surface of the input contact point section 20, by the connection wiring section 22 being folded at a substantially right angle toward the side of the input contact point section 20 and then folded toward the back surface side of the input contact point section 20 in this state.

Accordingly, since the wiring board 16 can be folded with the input contact point section 20 and the connection terminal section 21 being orthogonal to each other, the connection terminal section 21 can be reliably and favorably arranged by being inserted into the holding groove 27 of the holding member 17 from the side of the contact point arrangement section 26, and the input contact point section 20 of the wiring board 16 can be reliably and favorably arranged in the contact point arrangement section 26 of the holding member 17.

In this embodiment, the wiring groove section 26a where the connection arrangement portion 22 is arranged is provided in the contact point arrangement section 26 of the holding member 17. As a result, even though the connection wiring section 22 is arranged with it being folded back and overlapping with the back surface of the input contact point section 20, the connection wiring section 22 can be arranged within the wiring groove section 26a of the contact point arrangement section 26.

Accordingly, in the holding member 17, even when the connection wiring section 22 is overlapping with the back surface of the input contact point section 20 with it being folded back, the input contact point section 20 can be favorably arranged in a flat state in the contact point arrangement section 26 of the holding member 17 without rattling, whereby the wiring board 16 can be favorably and stably attached to the holding member 17.

Also, since the connection terminal section 21 of the wiring board 16 and the circuit board 14 are electrically connected to each other by the pair of spring members 28, the connection terminal section 21 and the circuit board 14 can be easily and reliably connected to each other by the pair of spring members 28.

That is, since the pair of spring members 28 are provided with them being electrically connected to the circuit board 14, the pair of spring members 28 can come in elastic contact with the pair of electrode sections 21a of the connection terminal section 21 when the circuit board 14 is arranged on the upper side of the holding member 17, so that the connection terminal section 21 and the circuit board 14 can be easily and reliably connected to each other.

In this embodiment, the notch section 27a, which exposes the connection terminal section 21 upward from inside of the holding groove 27 when the connection terminal section 21 of the wiring board 16 and the second reinforcement plate 24 are inserted into the holding groove 27 of the holding member 17, is provided in the holding groove 27 of the holding member 17. Therefore, the connection terminal section 21 can be unfailingly and favorably opposed to the circuit board 14 through the notch section 27a in a connectable state, and the pair of spring members 28 can easily come in contact with the connection terminal section 21 through the notch section 27a, when the circuit board 14 is arranged above the holding member 17.

Also, since the holding member 17 includes the board supporting section 27b which supports the circuit board 14 with the input contact point section 20 being opposed to the circuit board 14, the circuit board 14 can be supported by the board supporting section 27b when the connection terminal section 21 and the circuit board 14 are connected to each other by the pair of spring member 28.

As a result, the space between the circuit board 14 and the connection terminal section 21 opposing the circuit board 14 can be kept constant, and therefore the pair of spring members 28 provided in the circuit board 14 can reliably and favorably come in contact with the connection terminal section 21 with a constant contact pressure without the pair of the spring members 28 provided in the circuit board 14 being plastically deformed.

Also, since the wiring board 16 includes the first reinforcement plate 23 corresponding to the input contact point section 20 and the second reinforcement plate 24 corresponding to the connection terminal section 21 provided on the surface opposite to the surface where the input contact point section 20 and the connection terminal section 21 are provided, even though the wiring board 16 is formed of the bendable film 16a, the wiring board 16 can be reliably and favorably connected to the holding member 17.

Also, this portable terminal device includes the device case 1 where the holding member 17 attached with the wiring board 16 is mounted, in which the switch button 15 is provided in the side surface portion of the device case 1 such that it can protrude toward the outside of the device case 1, the circuit board 14 is arranged in the device case 1 in a manner to be orthogonal to the side surface portion of the device case 1, and the holding member 17 is mounted in the device case 1 with the input contact point section 20 of the wiring board 16 being opposed to the switch button 15 and the connection terminal section 21 being opposed to the circuit board 14. Therefore, the button switch 15 and the circuit board 14 can be connected to each other through the shortest route by the wiring board 16.

In the portable terminal device of this embodiment, when the circuit board 14 is attached to the lower case 3 with the holding member 17 attached with the wiring board 16 being arranged in the lower case 3 of the device case 1, the connection terminal section 21 of the wiring board 16 and the circuit board 14 are electrically connected to each other by the pair of spring members 28. Accordingly, the connection terminal section 21 of the wiring board 16 and the circuit board 14 can be easily connected to each other, so that the connecting operation can be further simplified.

In the above-described embodiment, the wiring board 16 is structured such that the input contact point section 20 is provided at one end portion of the film 16a, the connection terminal section 21 is provided on the other end portion on the same surface, the connection wiring section 22 is provided between the input contact point section 20 and the connection terminal section 21, and the first reinforcement plate 23 and the second reinforcement plate 24 are provided on the back surface of the film 16a. However, the present invention is not limited to this case, and a structure may be adopted in which, for example, the pair of electrode sections 20a of the input contact point section 20 are provided on the first reinforcement plate 23, the pair of electrode sections 21a of the connection terminal section 21 are provided on the second reinforcement plate 24, the pair of electrode lines 22a of the connection wiring section 22 are provided on the film 16a, and the input contact point section 20 of the first reinforcement plate 23 and the connection terminal section 21 of the second reinforcement plate 24 are electrically connected to each other by the film 16a.

Also, in the above-described embodiment, the present invention has been applied to a portable terminal device. However, the present invention is not necessarily required to be applied to a portable terminal, and may be widely applied to various electronic devices such as portable telephones and portable type information processing devices.

While the present invention has been described with reference to the preferred embodiments, it is intended that the invention be not limited by any of the details of the description therein but includes all the embodiments which fall within the scope of the appended claims.

What is claimed is:

1. A board connection structure comprising:
    a wiring board having a contact point section that is provided at one end portion and that is opposed to a switch button and a connection section that is provided at the other end portion on the same surface where the contact point section is provided and that is opposed to a circuit board, wherein the contact point section and the connection section are electrically connected to each other;
    a holding member to which the wiring board is attached with flat surfaces of the contact point section and the connection section on the same surface intersecting with each other by folding of the wiring board, wherein the holding member has a contact point arrangement section where the contact point section is arranged opposing the switch button with the flat surfaces of the contact point section and the connection section on the same surface intersecting with each other by the folding of the wiring board, and a holding groove where the connection section is inserted and exposed opposing the circuit board; and
    a device case having an attaching section where the holding member attached with the wiring board is mounted,
    wherein the switch button is provided in a side surface portion of the device case and is adapted to protrude toward an outside of the device case, wherein the circuit board is arranged in the device case in a manner to be orthogonal to the side surface portion of the device case, and wherein the holding member is mounted in the device case with the contact point section of the wiring board opposing the switch button and the connection section opposing the circuit board, and
    wherein the connection section of the wiring board is electrically connected to the circuit board in a state where the holding member is mounted to the attaching section in the device case.

2. The board connection structure according to claim 1, wherein the connection section and the circuit board are electrically connected to each other by a spring member.

3. The board connection structure according to claim 1, wherein the holding member includes a notch section which exposes the connection section with the connection section opposing the circuit board.

4. The board connection structure according to claim 1, wherein the holding member includes a supporting section which supports the circuit board with the connection section opposing the circuit board.

5. An electronic device comprising:
a wiring board having a contact point section that is provided at one end portion and that is opposed to a switch button and a connection section that is provided at the other end portion on the same surface where the contact point section is provided and that is opposed to a circuit board, wherein the contact point section and the connection section are electrically connected to each other;
a holding member to which the wiring board is attached with flat surfaces of the contact point section and the connection section on the same surface intersecting with each other by folding of the wiring board, wherein the holding member has a contact point arrangement section where the contact point section is arranged opposing the switch button with the flat surfaces of the contact point section and the connection section on the same surface intersecting with each other by the folding of the wiring board, and a holding groove where the connection section is inserted and exposed opposing the circuit board; and
a device case having an attaching section where the holding member attached with the wiring board is mounted,
wherein the switch button is provided in a side surface portion of the device case and is adapted to protrude toward an outside of the device case, wherein the circuit board is arranged in the device case in a manner to be orthogonal to the side surface portion of the device case, and wherein the holding member is mounted in the device case with the contact point section of the wiring board opposing the switch button and the connection section opposing the circuit board, and
wherein the connection section of the wiring board is electrically connected to the circuit board in a state where the holding member is mounted to the attaching section in the device case.

6. The electronic device according to claim 5, wherein the connection section and the circuit board are electrically connected to each other by a spring member.

7. The electronic device according to claim 5, wherein the holding member includes a notch section which exposes the connection section with the connection section opposing the circuit board.

8. The electronic device according to claim 5, wherein the holding member includes a supporting section which supports the circuit board with the connection section opposing the circuit board.

9. The electronic device according to claim 5, wherein the circuit board and the connection section of the wiring board are electrically connected to each other by a spring member when the circuit board is attached to the device case with the holding member attached with the wiring board being arranged in the device case.

10. The electronic device according to claim 5, further comprising an optical reading section which reads a barcode, wherein the switch button is a trigger switch for the optical reading section to perform a reading operation.

11. The electronic device according to claim 10, wherein the optical reading section is arranged on the circuit board, and the switch button is electrically connected to the optical reading section via the wiring board and the circuit board.

12. The electronic device according to claim 5, further comprising a display section which displays information, wherein the circuit board is provided to be parallel to the display section.

* * * * *